May 28, 1968  R. GOTTSCHALD  3,385,616

BALL JOINTS, ESPECIALLY FOR STEERING GEARS

Filed Nov. 16, 1965

Inventor
RUDOLF GOTTSCHALD
BY
Kenyon & Kenyon
ATTORNEYS

# United States Patent Office 3,385,616
Patented May 28, 1968

3,385,616
BALL JOINTS, ESPECIALLY FOR
STEERING GEARS
Rudolf Gottschald, Osterath, Germany, assignor to A.
Ehrenreich & Cie, Dusseldorf-Oberkassel, Germany
Filed Nov. 16, 1965, Ser. No. 508,083
Claims priority, application Germany, May 26, 1965,
E 29,381
1 Claim. (Cl. 287—87)

ABSTRACT OF THE DISCLOSURE

The invention relates to ball and socket joints having particular application in the linkage system of the steering mechanism for motor vehicles. Basically, the ball and socket joint consist of a typical hinge pin terminating in a ball head, an annular joint case adapted to accommodate the ball head and a mounting ring member which mounts the ball joint assembly and attaches it to the associated linkage of the system. In particular, the design of the joint case is substantially spherical and includes an inner spherical cavity adapted to acommodate the pin ball head. In addition, the joint case has an annular opening concentrically disposed about the vertical center line of the joint case through which the hinge pin passes and a second opening extending from the uppermost section of the spherical cavity to the outside of the joint case. The second opening is also annular and concentrically disposed about the case vertical centerline but slightly smaller than the opening through which the joint hinge pin passes. The joint case is also formed with an outer annular arcuate recess which extends from a plane substantially below the horizontal center line of the casing to the plane of the opening through which the hinge pin passes. The mounting ring is designed with the same dimensions as the annular arcuate recess and is adapted to fit therein. This design enables the ball joint case and pin to be inserted in the mounting ring from a location above the ring but will not allow the ball or joint case to be forced through the lower opening since the ring member terminates in an annular opening smaller than that of the diameter of the ball pin.

My invention relates to a ball joint, preferably in the form of an angular joint, especially intended for steering gears, in which the head of the joint pin is supported in a bearing body which is provided in the joint case and which is of an elastic material.

It is already known to use plastic material in the production of ball joint cases and to imbed strengthenings in the plastic material or to surround the plastic material by strengthenings. The plastic material may, at the same time, constitute the bearing surface for the ball head of the joint pin.

The principal object of the invention is to provide a ball joint, especially intended for steering gears, which is remarkable for a particularly simple construction enabling easy assembly, but which, despite of that, is reliable in every respect.

Specifically with respect to a solution of the said problem the present invention provides for an annular body being the case which receives the bearing body, which annular body has a passage opening for the joint pin, the said opening being reduced to a size less than the maximum cross section area of the joint pin head and the said bearing body being able to snap into the ring when inserted from the side which is not facing the opening for the passage of the joint pin.

The result of this design is a ball joint which consists of a small number of simple components which do not require exact processing and which are assembled simply by pressing the bearing body together with the ball pin into the case ring from that side which is not facing the opening for the passage of the joint pin. The case ring does not need to be extended but to the equator of the ball. But the said ring may even be less high. The bearing body may also be pressed into the case ring prior to insertion of the joint pin into the bearing body, provided that the bearing body has a sufficiently wide opening at the side which is not facing the opening where the joint pin leaves the bearing body. The case ring prevents the joint pin from being pulled out of the bearing body via the opening for the passage of the joint pin, while the lever eye which is to be provided at the joint pin prevents the bearing body or the joint pin from being pressed out towards the side which is not facing the passage opening.

In order to establish a catching connection between the bearing body and the case ring, the bearing body may be provided with a swelling which overlaps the rim of the case ring at the side where the joint pin leaves the case, so that the bearing ring may have smooth inside surfaces.

Practically, the case ring is a cup ring and the bearing body is a hollow ball cup which fits into the cup ring and which has a rim covering or overlapping the interior wall of the opening for the passage of the joint pin in the cup ring which opening gets wider towards the passage side.

Structurally, the universal ball and socket joint is comprised of a typical hinge pin terminating in a ball head, an annular joint case adapted to accommodate the ball head and a ring which mounts the joint case and connects it with the linkage of the steering mechanism. The annular case is provided with an internal spherical cavity into which the hinge pin ball head fits an opening through which the hinge pin passes. A second opening which extends from the upper portion of the spherical cavity to the outside of the joint case is provided and is of a smaller diameter than the opening through which the hinge pin passes. The outer surface of the joint case has formed therein a recess which extends from an intermediate point somewhat above the horizontal center line of the hinge pin ball head to a point in the plane of the opening through which the hinge pin passes. Since the joint case is spherical in shape, the recess conforms to the contour thereof and as such, in cross section takes a cup-like shape. This provides the opening in the cup through which the hinge pin passes with a diameter greater than the opening in the joint case for the hinge pin but substantially smaller than the diameter of the ball head. As a consequence, the joint case and ball head can be snapped into the ring from above but cannot be forced downwardly through the opening through which the joint pin passes.

The drawing is an example of a construction according to the invention.

Figure 1:
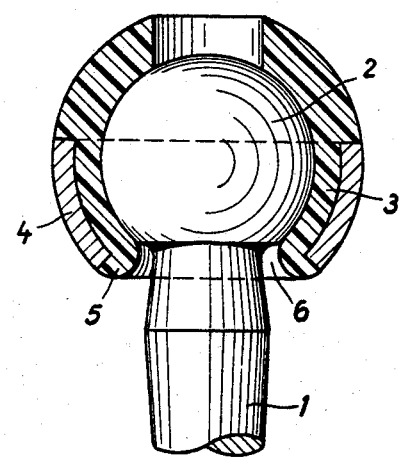
FIG. 1 is a vertical section of a ball joint.
Figure 2:
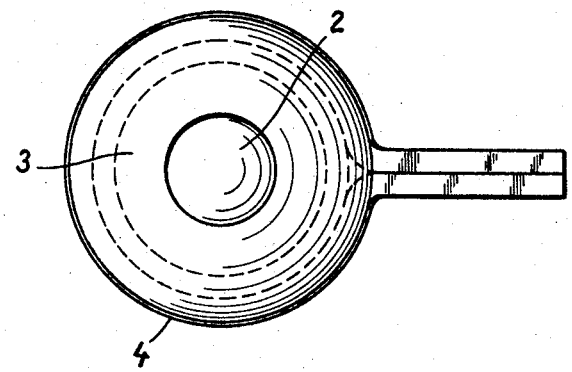
FIG. 2 is a top plan view of the ball joint shown in FIG. 1.

The ball joint which is shown in the drawing has a joint pin 1 with a ball head 2 which is supported in a bearing body 3 being of an elastic plastic material, preferably of polyurethane. The bearing body is inserted into a cup ring 4 which is, for instance, made from sheet steel. In the preferred construction of the ball joint according to the invention which is drawn in full lines, the bearing body 3 is a hollow ball cup which fits into the cup ring 4. The upper rim of the hollow ball cup is located slightly above the equator of the ball. At the opening side for the passage of the joint pin the rim 5 of the bearing body overlaps the rim of the opening 6 for the joint pin in the cup ring 4 which opening gets larger towards the outside. The diameter of the opening 6 is smaller than the diameter of the ball head 2.

For assembly of the joint the bearing body together with the ball pin is pressed into the cup ring 4 from that side which is not facing the opening for the passage of the joint pin, in which case the rim 5 of the bearing body snaps into the opening 6 of the cup ring which is to be passed by the joint pin and which rim covers the inside wall of the opening which gets larger towards the outside.

The joint pin is fixed in a lever eye which is not shown in the drawing. In this case a packing of an already known type for the opening for the passage of the joint pin may be provided between the lever eye and the ball joint. The packing may, for instance, consist of a layer or ply of an elastic material which is interspersed with small hollow cells as, for instance, foam rubber or similar.

If the bearing body overlaps the ball head even at the side of the equator of the ball which is not facing the opening for the passage of the joint pin, as has been shown in FIG. 1 by a line of dots and dashes, the bearing body is snapped onto the ball head before it is pressed into the cup ring 4.

I claim:
1. A ball and socket universal joint comprising:
   (a) a hinge pin terminating in a ball head;
   (b) an elastic spherical open-ended joint case having a centrally disposed spherical cavity therein to accommodate the hinge pin ball head and also having a spherical outer periphery, an access opening concentrically disposed about the joint case center line at one end thereof and providing communication from the outside to the internal cavity and through which the hinge pin shaft passes and an opening at the diametrically opposite end of the spherical cavity having a smaller diameter than the hinge pin opening, and an annular peripheral recess in the spherical outer periphery of the joint case conforming to the contour of the outer periphery of the resilient joint case which recess extends from a plane, between the major diameter of the hinge pin ball head and said opposite end of the cavity to a plane adjacent to but spaced from the hinge pin opening; and
   (c) a substantially annular cup-like mounting member having the same dimensions as the joint case annular peripheral recess fitted in the annular peripheral recess so as to be contiguous with said spherical outer periphery to mount the ball and socket joint and having an opening around the joint case access opening which is smaller than the maximum diameter of the ball head; whereby,
the resilient joint case and ball head can be snapped into the cup-like mounting member from the side of the mounting member having the larger outside diameter but will be prevented from passing through the mounting member by the constricted size of the mounting member opening about the case hinge pin opening.

References Cited

UNITED STATES PATENTS

| 2,424,914 | 7/1947 | Brown | 287—85 |
| 2,876,029 | 3/1959 | Latzen | 287—90 |

FOREIGN PATENTS

| 543,013 | 2/1942 | Great Britain. |
| 895,068 | 4/1962 | Great Britain. |
| 916,291 | 1/1963 | Great Britain. |
| 1,366,571 | 6/1964 | France. |

CARL W. TOMLIN, *Primary Examiner.*

ANDREW KUNDRAT, *Assistant Examiner.*